US012577367B2

(12) United States Patent
Shi et al.

(10) Patent No.: US 12,577,367 B2
(45) Date of Patent: Mar. 17, 2026

(54) THERMOPLASTIC COMPOSITION, CONSOLIDATED LAMINATE STRUCTURE, AND METHOD FOR MANUFACTURING THEREOF

(71) Applicant: The Boeing Company, Chicago, IL (US)

(72) Inventors: Ying Shi, St. Louis, MO (US); Marcos Pantoja, St. Louis, MO (US); Alexander M. Rubin, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 554 days.

(21) Appl. No.: 17/938,721

(22) Filed: Oct. 7, 2022

(65) Prior Publication Data

US 2023/0159723 A1 May 25, 2023

Related U.S. Application Data

(63) Continuation-in-part of application No. 17/530,978, filed on Nov. 19, 2021, now Pat. No. 12,227,647.

(51) Int. Cl.
| | |
|---|---|
| *C08K 3/04* | (2006.01) |
| *C08K 7/18* | (2006.01) |
| *C08L 71/00* | (2006.01) |

(52) U.S. Cl.
CPC ................. *C08K 3/04* (2013.01); *C08K 7/18* (2013.01); *C08L 71/00* (2013.01); *C08K 2201/001* (2013.01); *C08K 2201/005* (2013.01); *C08K 2201/011* (2013.01); *C08L 2203/16* (2013.01); *C08L 2205/02* (2013.01); *C08L 2205/18* (2013.01)

(58) Field of Classification Search
CPC ........ C08K 2201/001; C08K 2201/005; C08K 2201/011; C08K 3/04; C08K 7/18; C08K 9/02; C08L 2203/16; C08L 2205/02; C08L 2205/18; C08L 71/00
See application file for complete search history.

(56) References Cited

U.S. PATENT DOCUMENTS

| | | | |
|---|---|---|---|
| 5,066,536 A | 11/1991 | Cogswell et al. | |
| 6,110,576 A * | 8/2000 | Decker .................. | B32B 27/18 428/300.1 |
| 2003/0186068 A1 | 10/2003 | Taniguchi et al. | |
| 2010/0170637 A1 | 7/2010 | Iannone | |
| 2010/0267883 A1* | 10/2010 | Bhatt ...................... | C08J 5/005 524/495 |
| 2015/0080502 A1* | 3/2015 | Gharda .................. | C08L 71/10 524/404 |
| 2015/0298388 A1 | 10/2015 | Wong et al. | |
| 2021/0102068 A1 | 4/2021 | Said et al. | |

FOREIGN PATENT DOCUMENTS

| | | | |
|---|---|---|---|
| CN | 103088462 A * | 5/2013 | |
| EP | 0485991 A1 * | 5/1992 | |
| EP | 2 899 231 | 7/2015 | |
| EP | 3 854 834 | 7/2021 | |
| JP | 2010265387 A * | 11/2010 | |
| WO | WO 2006/006508 | 1/2006 | |

OTHER PUBLICATIONS

JP-2010265387-A machine translation (Nov. 25, 2010).*
CN-103088462-A (May 8, 2013) machine translation.*
Smiley et al.: "Dual polymer bonding of thermoplastic composite structures," Polymer Engineering & Science (Apr. 1991).
European Patent Office, Extended European Search Report, App. No. 22194863.1 (May 19, 2023).
Harris et al: "Miscible blends of poly(aryl ether ketone)s and polyetherimides," *Journal of Applied Polymer Science*, vol. 35, No. 7, pp. 1877-1891 (May 20, 1988).
Crevecoeur et al: "Binary Blends of Poly(ether ether ketone) and Poly(ether imide). Miscibility, Crystallization Behavior, and Semicrystalline Morphology," *Macromolecules, American Chemical Society, US*, vol. 24, No. 5, pp. 1190-1195 (Mar. 4, 1991).

* cited by examiner

*Primary Examiner* — Ana L. Woodward
(74) *Attorney, Agent, or Firm* — Walters & Wasylyna LLC

(57) ABSTRACT

A thermoplastic composition includes a thermoplastic polymer and electrically conductive particles dispersed in the thermoplastic polymer.

20 Claims, 11 Drawing Sheets

600

1

THERMOPLASTIC COMPOSITION, CONSOLIDATED LAMINATE STRUCTURE, AND METHOD FOR MANUFACTURING THEREOF

PRIORITY

The present application is a continuation-in-part of, and claims priority from, U.S. Ser. No. 17/530,978, filed on Nov. 19, 2021, which is titled "THERMOPLASTIC FILMS AND METHODS FOR COATING THERMOPLASTIC SUBSTRATES WITH THERMOSET MATERIALS," the entire contents of which are incorporated herein by reference.

FIELD

The present application relates to the field of thermoplastic structures, in particular polyaryletherketone-based thermoplastic structures.

BACKGROUND

The process of finishing polyaryletherketone-based thermoplastic structural components with a thermoset material presents challenges, specifically with respect to medium and large-scale components, particularly those used in airstream applications. Current surface treatment techniques include the need for mechanically treating substrate surfaces using techniques such as sand blasting, grit blasting, plasma treatment, and other techniques that roughen substrate surfaces prior to bonding with a finishing material.

Furthermore, implementation of polyaryletherketone-based thermoplastic structural components into medium to large scale components is restricted by a technology gap in electromagnetic effects (EME) protection. Expanded copper is one approach for addressing EME. However, this approach can present challenges with regards to finishing quality and induction welding while adding extra process steps during manufacturing.

Accordingly, those skilled in the art continue with research and development in the field of thermoplastic structures, in particular polyaryletherketone-based thermoplastic structures.

SUMMARY

In one embodiment, a thermoplastic composition includes a thermoplastic polymer and electrically conductive particles dispersed in the thermoplastic polymer.

In another embodiment, a consolidated laminate structure includes a thermoplastic substrate and a thermoplastic composition consolidated with the thermoplastic substrate to define a receiving surface. The thermoplastic composition includes a thermoplastic polymer and electrically conductive particles dispersed in the thermoplastic polymer.

In yet another embodiment, a method for manufacturing a consolidated laminate structure includes applying a thermoplastic composition to a first major surface of a thermoplastic substrate. The thermoplastic composition includes a thermoplastic polymer and electrically conductive particles dispersed in the thermoplastic polymer. The method further includes co-consolidating the thermoplastic composition with the thermoplastic substrate to define a receiving surface.

Other embodiments of the disclosed thermoplastic compositions, consolidated laminate structures, and methods for manufacturing thereof, will become apparent from the following detailed description, the accompanying drawings and the appended claims.

DETAILED DESCRIPTION

Disclosed are thermoplastic compositions and methods for modifying a receiving surface of a consolidated laminate structure. The thermoplastic compositions and methods improve an electrical conductivity of a consolidated laminate structure, which may provide for EME protection for an aircraft comprising the consolidated laminate structure.

The thermoplastic compositions and methods may also facilitate induction welding of a consolidated laminate structure with another structure.

The thermoplastic compositions and methods may also improve compatibility of a consolidated laminate structure and a thermoset coating, such as an epoxy-based primer. The disclosed thermoplastic compositions and methods may account for threshold adhesive properties with the thermoset coating and miscibility of the components of the compositions. The result is a modified surface of the thermoplastic composite material to enhance compatibility to a thermoset coating.

Figure 1:
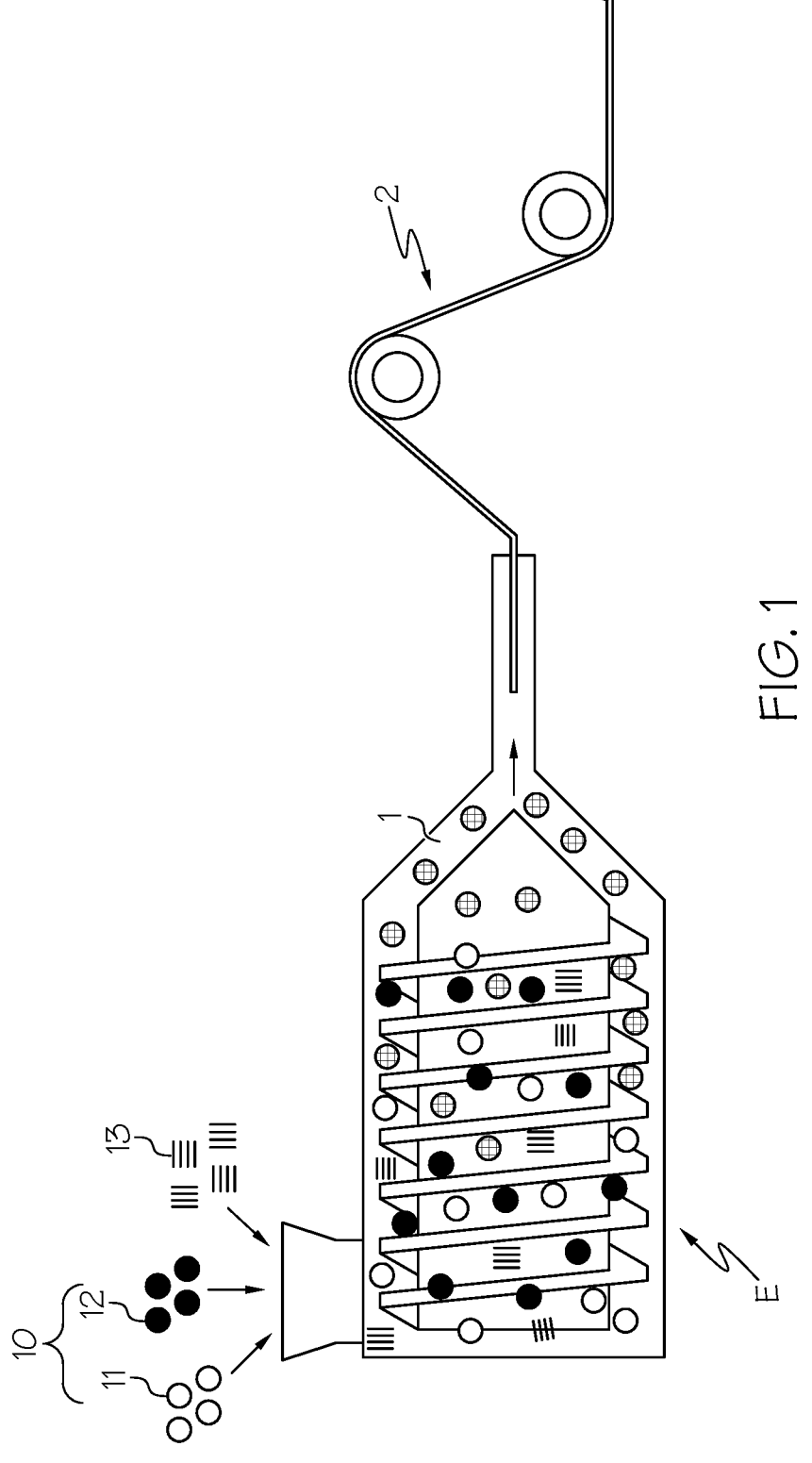
FIG. 1 is a schematic diagram of a method for forming a thermoplastic film according to the present description.

Referring to FIG. 1, disclosed is a thermoplastic composition 1. The thermoplastic composition 1 includes a thermoplastic polymer 10 and electrically conductive particles 13 dispersed in the thermoplastic polymer 10. The thermoplastic polymer 10 may include, for example, a first thermoplastic polymer 11 in admixture with a second thermoplastic polymer 12. The thermoplastic composition 1 may be manufactured by, for example, combining and blending the thermoplastic polymer 10 and the electrically conductive particles 13 in an extruder E and extruding the resulting thermoplastic composition 1 into a coating, such as a film 2.

The thermoplastic polymer 10 may be selected based upon desired material properties. For example, a film 2 of the thermoplastic composition 1 may be mixed with a thermoplastic substrate material during a consolidation process and may be coated with a thermoset coating. The thermoplastic polymer 10 of the thermoplastic composition 1 may be selected based upon material properties such as miscibility with the thermoplastic substrate material and threshold adhesive properties that align with the mating thermoset coating. Thus, the underlying thermoplastic substrate may be made from a polyaryletherketone polymer or other material not having threshold adhesive properties with thermoset coatings and the surface of the thermoplastic substrate may be modified by consolidation with the thermoplastic composition 1 of the present description to enhance compatibility of the thermoplastic substrate with the thermoset coating.

In one aspect, the thermoplastic polymer may include a semi-crystalline thermoplastic polymer material. In another aspect, the thermoplastic polymer may include a polyaryletherketone polymer. The polyaryletherketone polymer may be in the form of a semi-crystalline material belonging to the family of polyaryletherketone (PAEK) polymers. The polyaryletherketone polymer may be in the form of a film, plastic pellets, powder, etc. The polyaryletherketone polymer may include polyether ether ketone. In another example, the polyaryletherketone polymer includes polyether ketone ketone. In yet another example, the polyaryletherketone polymer includes a blend of at least two polyaryletherketones. For example, the polyaryletherketone polymer may include a blend of polyether ketone ketone and polyether ether ketone. Polyaryletherketone polymers provide for miscibility with a thermoplastic substrate formed from thermoplastic polyaryletherketone polymers.

In an aspect, the thermoplastic polymer may include an amorphous thermoplastic polymer. In another aspect, the thermoplastic polymer may include polyetherimide. In another aspect, the thermoplastic polymer may include amorphous polyetherimide. Polyetherimide is miscible with polyaryletherketone polymers and provides adhesive properties that align with the mating thermoset coating and is compatible with aerospace grade paints and coatings and stable at processing temperatures of at least about 350° C.

In another aspect, the thermoplastic polymer may include a polyaryletherketone polymer in admixture with polyetherimide. The thermoplastic composition 1 may include a ratio of the polyetherimide to the polyaryletherketone polymer. In one example, the ratio of the polyetherimide to the polyaryletherketone polymer is between about 5:95 and about 50:50. In another example, the ratio of the polyetherimide to the polyaryletherketone polymer is between about 10:90 and about 50:50. In yet another example, the ratio of the polyetherimide to the polyaryletherketone polymer is between about 20:80 and about 50:50.

The thermoplastic composition 1 may have a high or low melting temperature based on respective melting and softening temperatures of constituents of the thermoplastic composition 1. In one example, the melting temperature of the polyaryletherketone polymer is about 250° C. to about 350° C. In another example, the melting temperature of the polyaryletherketone polymer is at least about 300° C.

The thermoplastic composition 1 may have a degree of crystallinity based on respective crystallinity of constituents of the thermoplastic composition 1. In an aspect, a degree of crystallinity of the thermoplastic composition 1 may range from about 1 percent to about 30 percent. In an aspect, a degree of crystallinity of the thermoplastic composition 1 may range from about 2 percent to about 15 percent. In an aspect, a degree of crystallinity of the thermoplastic composition 1 may range from about 3 percent to about 10 percent.

The thermoplastic composition 1 may include additional additives. In one example, the thermoplastic composition 1 includes a heat stabilizer. In another example, the thermoplastic composition 1 includes a nucleating agent.

The electrically conductive particles 13 may have an amount, composition, shape, and size selected to achieve desired electrical properties.

The amount of electrically conductive particles may be selected to achieve desired electrical properties. In an aspect, the amount of electrically conductive particles may be more than a minimum amount sufficient to achieve a percolating network. In an aspect, the amount of electrically conductive particles may be less than a maximum amount sufficient to enable induction welding. For example, the amount of electrically conductive particles may be added in amount needed to meet the EME requirements, but is not too conductive to significantly affect the induction welding process.

The amount of electrically conductive particles may depend on a composition, shape, and size of the electrically conductive particles. In an aspect, the amount of electrically conductive particles in the thermoplastic composition is in a range from about 0.1 to about 90 percent by weight. In another aspect, the amount of electrically conductive particles in the thermoplastic composition is in a range from about 0.5 to about 75 percent by weight. In another aspect, the amount of electrically conductive particles in the thermoplastic composition is in a range from about 1 to about 50 percent by weight.

The electrically conductive particles may be composed of any electrically conductive material having compatibility with the other components of the thermoplastic composition 1. In an example, the electrically conductive particles may include metal-based electrically conductive particles, such as nickel-based electrically conductive particles, copper-based electrically conductive particles, iron-based electrically conductive particles, chromium-based electrically conductive particles, or cobalt-based electrically conductive particles, or combinations thereof. In another example, the electrically conductive particles may include carbon-based electrically conductive particles, such as carbon nanotubes. In yet another example, the electrically conductive particles may include metal coated graphite, such as nickel coated graphite.

The electrically conductive particles may have a shape selected to achieve desired electrical properties. In an example, the electrically conductive particles may include spherical-shaped electrically conductive particles. In another example, the electrically conductive particles may include platelet-shaped electrically conductive particles. In another example, the electrically conductive particles may include rod-shaped electrically conductive particles.

The electrically conductive particles may have a size selected to achieve desired electrical properties. In an example, the electrically conductive particles may include nano scale electrically conductive particles. In another example, the electrically conductive particles may include micro scale electrically conductive particles.

Figure 2:
FIG. 2 is a schematic diagram of a thermoplastic film according to the present description.
Figure 3:
FIG. 3 is a schematic diagram of another thermoplastic film according to the present description.

Referring to FIGS. 1 to 3, the thermoplastic composition 1 may be extruded into a film 2. The film 2 includes a thermoplastic polymer 20 and electrically conductive particles 23 dispersed in the thermoplastic polymer 20. The thermoplastic polymer 20 may include, for example, a first thermoplastic polymer 21 in admixture with a second thermoplastic polymer 22. The thermoplastic film 2 may be manufactured by, for example, combining and blending the thermoplastic polymer 10 (which may include the first thermoplastic polymer 11 in admixture with the second thermoplastic polymer 12) and the electrically conductive particles 13 in an extruder E and extruding the above-described thermoplastic composition 1 into a film 2. In one example, the film 120 has a thickness of about 1 mil to about 15 mil.

Referring to FIGS. 2 and 3, the first thermoplastic polymer 21 is preferably a semi-crystalline thermoplastic polymer material such as a polyaryletherketone polymer, and the second thermoplastic polymer 22 is preferably an amorphous thermoplastic polymer such as polyetherimide. FIG. 2 shows that the electrically conductive particles 13 are present in amount such that the electrically conductive particles 13 are isolated. FIG. 3 shows that the electrically conductive particles 13 are present in amount such that the electrically conductive particles 13 form a percolating network. The percolation threshold is the concentration at which there are enough electrically conductive particles in the matrix to form a semi-continuous network of electrically conductive particles. At this threshold, the conductivity begins to increase exponentially due to the inter-connectivity of the particles which can transfer and disperse the incoming electromagnetic energy more efficiently. Prior to this threshold, the particles are discontinuous and relatively isolated from each other. The percolation threshold will be unique vary based on the nature of the electrically conductive particles 13, including the size and shape.

Figure 4:
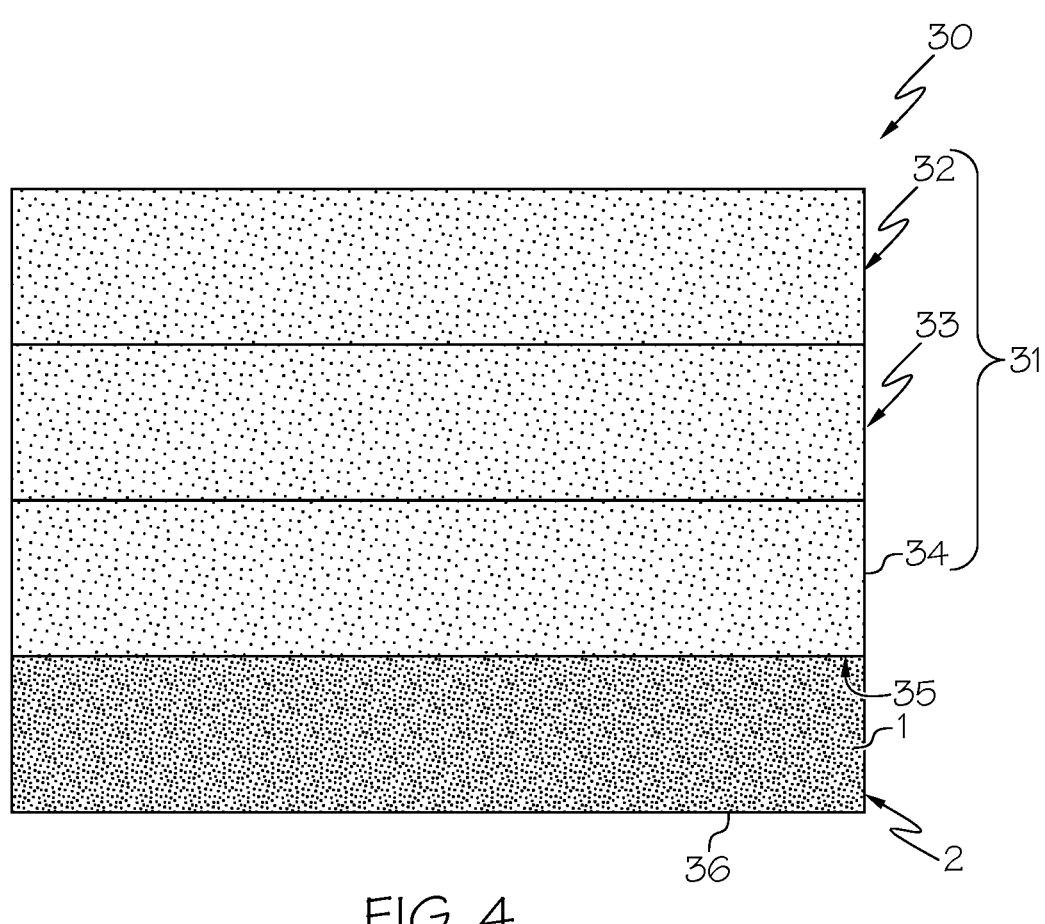
FIG. 4 is a cross sectional schematic of a laminate structure prior to consolidation according to the present description.

FIG. 4 illustrates a laminate structure 30 including a thermoplastic substrate 31 and the thermoplastic composition 1 in the form of a film 2 positioned on the thermoplastic substrate 31 to define a receiving surface 36. The thermoplastic substrate 31 includes a thermoplastic polymer. In one example, the thermoplastic polymer of the thermoplastic substrate 31 includes a polyaryletherketone polymer. The thermoplastic substrate 31 may be formed of multiple plies 32, 33, 34 of laminate (e.g., at least two plies, such as 5 or more plies) in a stacked configuration and having a first major surface 35 for receiving the film 2 thereon. The multiple plies 32, 33, 34 of laminate may include a polymer from the family of polyaryletherketone (PAEK) polymers. In one example, the multiple plies 32, 33, 34 of laminate include polyether ketone ketone. The thermoplastic substrate 31 may be a thermoplastic fiber composite substrate, and may include a thermoplastic polymer and a fiber material, such as carbon fiber. In an aspect, each of the multiple plies 32, 33, 34 may include a thermoplastic polymer and a fiber material, such as carbon fiber.

Figure 5:
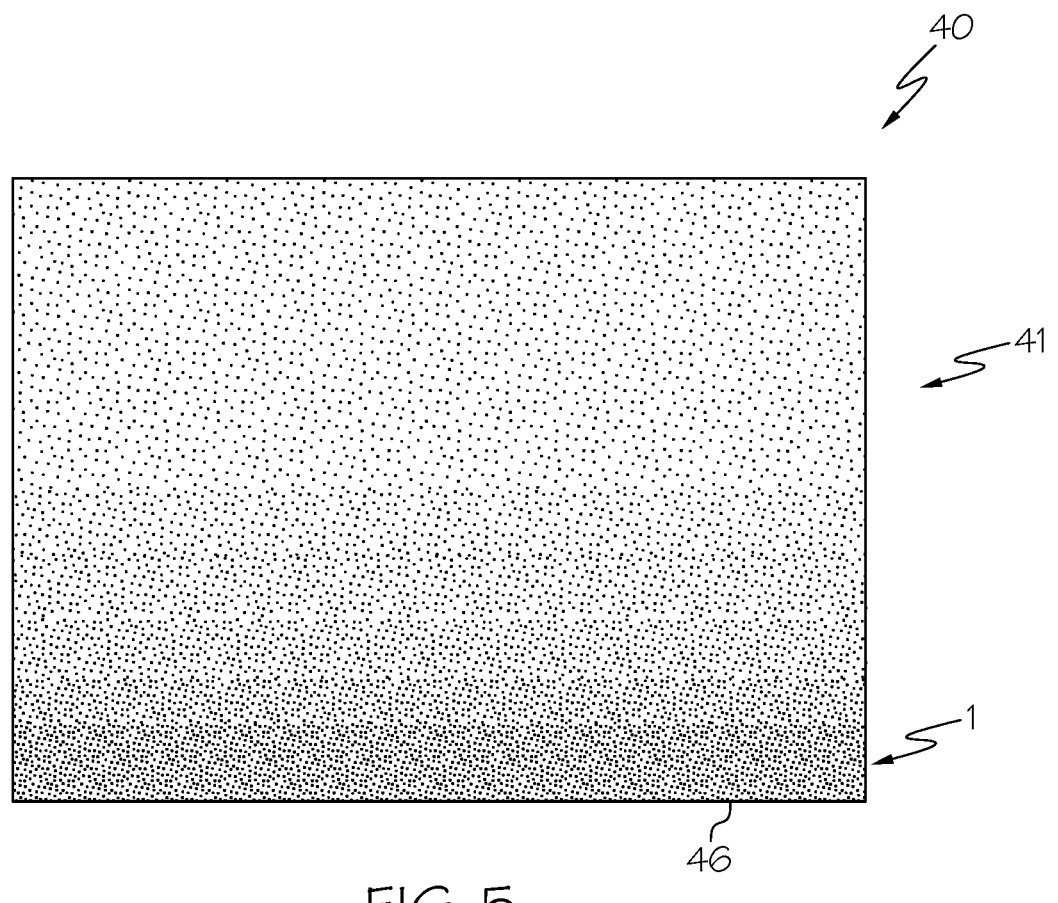
FIG. 5 is a cross sectional schematic of the laminate structure of FIG. 4 after consolidation.

Referring to FIG. 5, the laminate structure 30 may be co-consolidated into a consolidated laminate structure 40 having a receiving surface 46 corresponding to the receiving surface 36 of the film 2 of FIG. 4. The consolidated laminate structure 40 includes a thermoplastic substrate 41 corresponding to thermoplastic substrate 31 consolidated with the thermoplastic composition 1, the thermoplastic composition 1 defining the receiving surface 46. The thermoplastic composition includes a thermoplastic polymer as described above. For example, the thermoplastic composition may include a polyaryletherketone polymer in admixture with polyetherimide.

Figure 6:
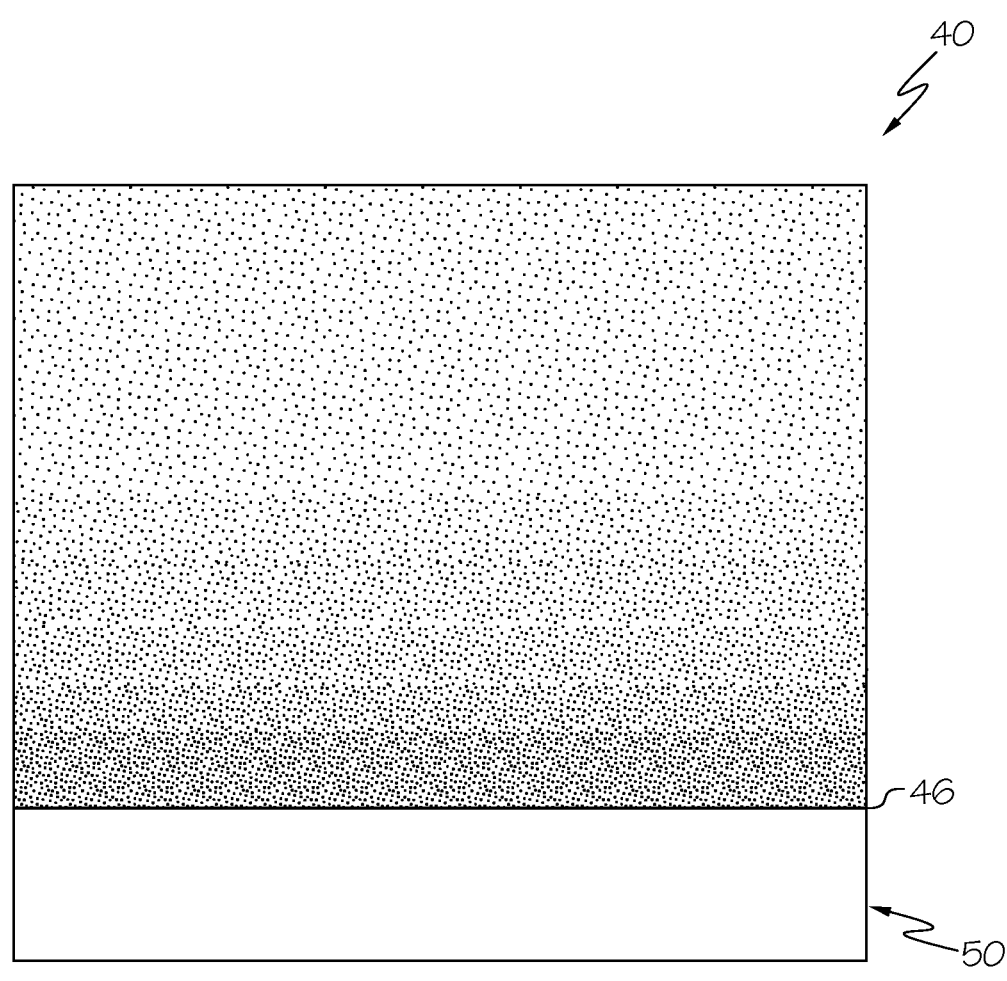
FIG. 6 is a cross sectional schematic of the laminate structure of FIG. 5 with an additional coating.

Referring to FIG. 6, the consolidated laminate structure 40 may further include a thermoset material 50 applied to the receiving surface 46. In one example, the thermoset material 50 is in the form of a thermoset coating. In one example, the thermoset material 50 may include an epoxy. In another example, the thermoset material 50 may be a primer, such as a paint primer. Additionally, the consolidated laminate structure 40 may further include a top coat 60 applied to the thermoset material 50 or primer, see FIG. 7. In one example, the top coat 60 includes polyurethane.

The consolidated laminate structure as described above may form an exterior component of an aircraft body of an aircraft and the thermoplastic composition including the electrically conductive particles dispersed in the thermoplastic polymer may facilitate for EME protection of the exterior component. In particular, the consolidated laminate structure may be incorporated into external applications such as fuselage skins, wing skins, horizontal stabilizer skins, vertical stabilizer skins, control surfaces, chine structures, etc. Inadequate EME solutions has been a main reason programs have been reluctant to consider thermoplastic composites for the aforementioned applications. Additionally, by avoiding the use of expanded copper foil, the consolidated laminate structure can enable another added benefit from a weight savings perspective, wherein the electrically conductive particles of the present description can yield adequate conductivity at a fraction of the weight introduced by conventional expanded copper foil.

In an aspect, the consolidated laminate structure may provide for a customizable solution for addressing EME at various locations of the aircraft. In this regards, the amount of electrically conductive particles dispersed in the thermoplastic polymer may selectively vary according to the position of the consolidated laminate structure. Thus, an added benefit of being able to precisely control the conductivity of the surfacing film will be to vary the electrically conductive particle loading based on different structures on an aircraft. Some structures are more prone to EME effects or have a requirement for higher electrical conductivity. Those structures may be loaded with more electrically conductive particles to make the structure more electrically conductive. On the other hand, there are some structures on an aircraft with less EME susceptibility or with a lower electrical conductivity requirement. Those structures can be loaded with less electrically conductive particles. By having this variability, it is possible to save weight on the aircraft by adding extra electrically conductive particles in areas which they are needed the most.

Figure 8:
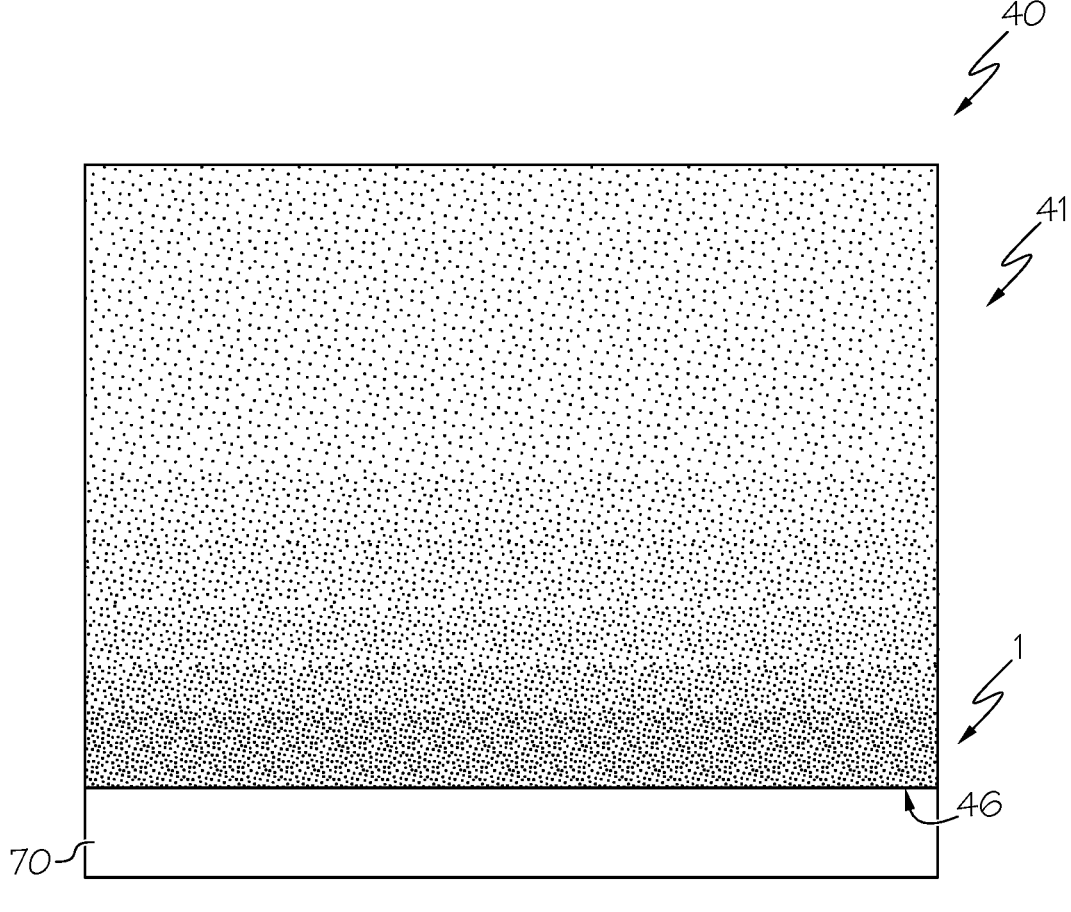
FIG. 8 is a schematic diagram relating to a method for method for induction welding according to the present description.

The consolidated laminate structure as described above may be used in a method for induction welding. Referring to FIG. 8, the method includes positioning a consolidated laminate structure 40 adjacent to another structure 70, and passing an electromagnetic current through the consolidated laminate structure 40 to melt at least a portion of the thermoplastic polymer thereof and thereby join the consolidated laminate structure and the another structure. The electrically conductive particles dispersed in the thermoplastic polymer may facilitate heating of the thermoplastic composition by induction heating to melt at least a portion thereof. Upon solidification of the melted thermoplastic composition, the consolidated laminate structure 40 is joined to the structure 70. One key joining techniques for PAEK thermoplastic composites is induction welding. Induction welding passes an electromagnetic current through the composite laminate. As it does so, this current interacts with the inherent conductive nature of the carbon fiber in the composite to generate heat which quickly melts the PAEK thermoplastic and therefore joins the two structures.

Figure 9:
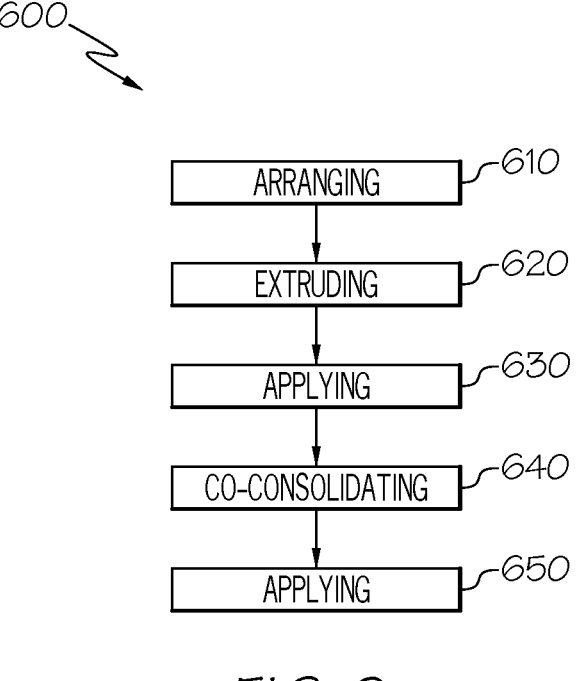
FIG. 9 is a flow diagram of a method for manufacturing a consolidated laminate structure according to the present description.

Referring to FIG. 9, disclosed is a method 600 for manufacturing a consolidated laminate structure 30. The method 600 includes applying the thermoplastic composition 1 to the first major surface 35 of the thermoplastic substrate 31. In one example, the thermoplastic substrate is a layered structure including multiple plies 32, 33, 34 of thermoplastic material. The thermoplastic composition 1 of the method 600 includes the thermoplastic polymer 20 and electrically conductive particles 23 dispersed in the thermoplastic polymer 20. In one example, the thermoplastic composition 1 includes a polyaryletherketone polymer in admixture with a polyetherimide.

Still referring to FIG. 9, the method 600 further includes co-consolidating 640 the thermoplastic composition 1 with the thermoplastic substrate 31 to define a receiving surface 36. In one or more examples, the co-consolidating 640 is performed at a temperature of about 275° C. to about 400° C. In another example, the co-consolidating 640 is performed at a temperature of about 330° C. to 400° C. In yet another example, the co-consolidating 640 is performed at a temperature of at least 340° C. The co-consolidating 640 may include any means including compression molding or stamp forming.

Figure 7:
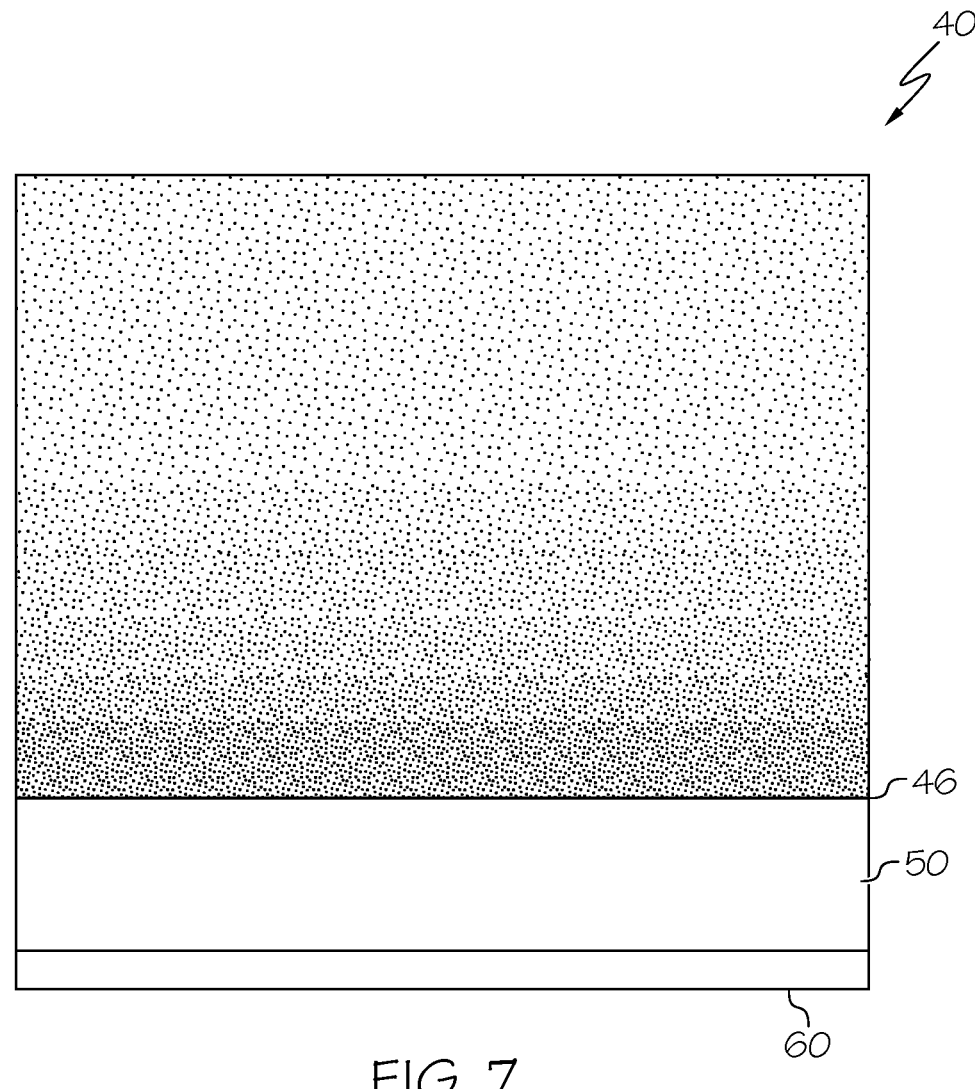
FIG. 7 is a cross sectional schematic of the laminate structure of FIG. 6 with an additional coating.

The method 600 may further include applying 650 a thermoset material 50 such as a thermoset coating, to the receiving surface 46. In one example, the thermoset material 50 of the method 600 includes an epoxy. In another example, the thermoset material 50 of the method 600 is a primer, such as a paint primer. Referring to FIG. 7, the method 600 may further include applying a top coat 60 to the thermoset material 50. In one example, the top coat 60 includes polyurethane.

Still referring to FIG. 9, the method 600 may further include, prior to the applying 630, extruding 620 the thermoplastic composition 1. The extruding 620 may include extruding 620 the thermoplastic composition 1 to yield a thermoplastic film 2.

The method 600 may further include, prior to the applying 630, arranging 610 multiple plies 32, 33, 34 of laminate in a stacked configuration to yield the thermoplastic substrate 31. The arranging 610 may be performed by any suitable means of arranging plies of laminate. The multiple plies 32, 33, 34 of laminate may include, for example, at least one of polyether ether ketone and polyether ketone ketone, or a blend thereof.

Figure 10:
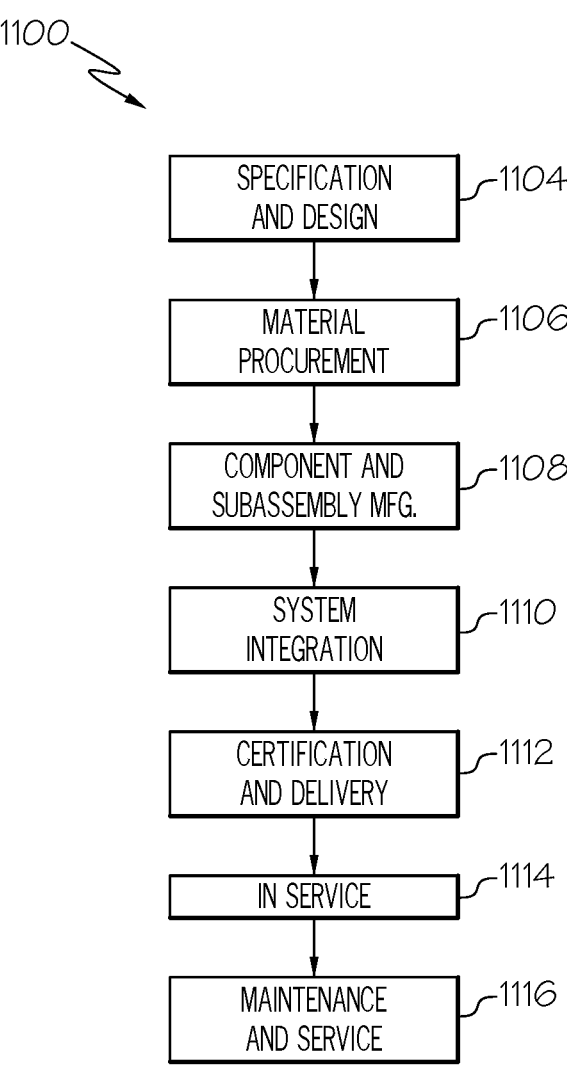
FIG. 10 is a block diagram of aircraft production and illustrative methodology.
Figure 11:
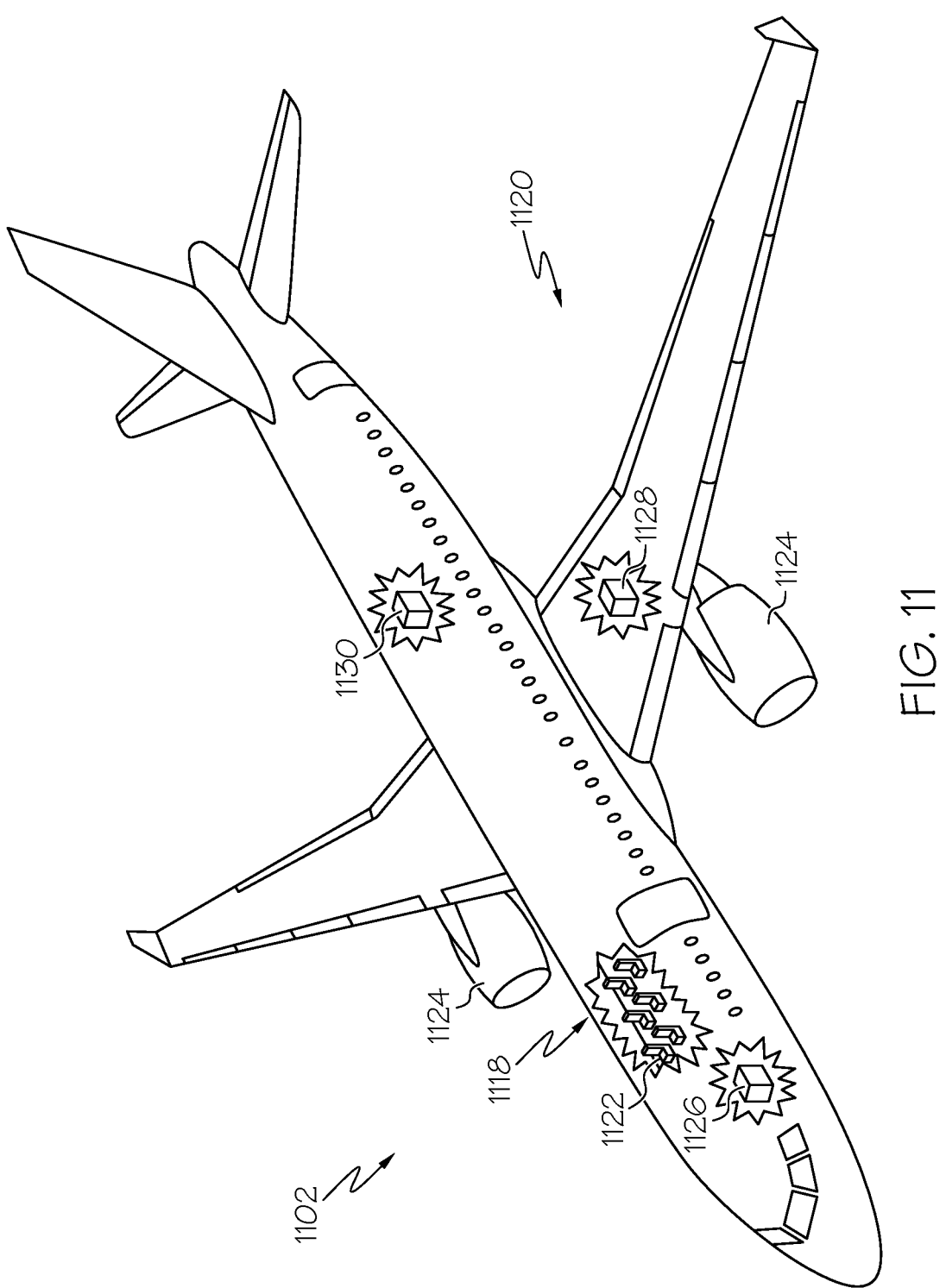
FIG. 11 is a schematic illustration of an aircraft.

Referring to FIG. 10 and FIG. 11, the disclosed consolidated laminate structure, thermoplastic composition and method will be used in the context of aircraft manufacturing and service including material procurement (block 1106), production, component and subassembly manufacturing (block 1108), and certification and delivery (block 1112) of aircraft 1102.

Examples of the subject matter disclosed herein may be described in the context of aircraft manufacturing and illustrative method 1100 as shown in FIG. 10 and aircraft 1102 as shown in FIG. 11. In one or more examples, the consolidated laminate structure 100 comprises a stringer assembly used in aircraft manufacturing. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major system subcontractors; a third party may include, without limitation, any number of vendors, subcontractors, and suppliers; and an operator may be an airline, leasing company, military entity, service organization, and so on.

As shown in FIG. 11, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and illustrative method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages component and subassembly manufacturing (block 1108) and system integration (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the composition(s), structure(s) and method(s) disclosed herein include a variety of components, features, and functionalities. It should be understood that the various examples of composition(s), structure(s) and method (s), disclosed herein, may include any of the components, features, and functionalities of any of the other examples of the composition(s), structure(s) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

Although various embodiments of the disclosed thermoplastic compositions, consolidated laminate structures, and methods for manufacturing thereof, have been shown and described, modifications may occur to those skilled in the art upon reading the specification. The present application includes such modifications and is limited only by the scope of the claims.

What is claimed is:

1. A thermoplastic composition comprising:
   a thermoplastic polymer, wherein the thermoplastic polymer comprises polyetherimide in admixture with a polyaryletherketone polymer, wherein a ratio of the polyetherimide to the polyaryletherketone polymer is between about 20:80 and about 50:50; and
   electrically conductive particles dispersed in the thermoplastic polymer, wherein the electrically conductive particles include metal coated graphite.

2. The thermoplastic composition of claim 1, wherein an amount of electrically conductive particles in the thermoplastic composition is in a range from about 0.5 to about 75 percent by weight.

3. The thermoplastic composition of claim 1, wherein an amount of electrically conductive particles in the thermoplastic composition is in a range from about 1 to about 50 percent by weight.

4. The thermoplastic composition of claim 1 wherein the polyaryletherketone polymer has a melting temperature of about 275° C. to about 350° C.

5. The thermoplastic composition of claim 1 comprising a degree of crystallinity from about 1 percent to about 30 percent.

6. The thermoplastic composition of claim 5, wherein the degree of crystallinity is in a range from about 2 percent to about 15 percent.

7. The thermoplastic composition of claim 1, wherein the metal coated graphite comprises nickel coated graphite.

8. The thermoplastic composition of claim 1, wherein the amount of electrically conductive particles is more than a minimum amount sufficient to achieve a percolating network but less than a maximum amount sufficient to enable induction welding.

9. The thermoplastic composition of claim 1, further comprising a heat stabilizer.

10. The thermoplastic composition of claim 1, further comprising a nucleating agent.

11. The thermoplastic composition of claim 1, wherein the electrically conductive particles comprise nano scale electrically conductive particles.

12. The thermoplastic composition of claim 1, wherein the electrically conductive particles comprise micro scale electrically conductive particles.

13. The thermoplastic composition of claim 1, wherein the electrically conductive particles comprise spherical-shaped, platelet-shaped, or rod-shaped particles.

14. The thermoplastic composition of claim 1, wherein the polyaryletherketone polymer comprises-polyether ether ketone.

15. The thermoplastic composition of claim 1, wherein the polyaryletherketone polymer comprises polyether ketone ketone.

16. The thermoplastic composition of claim 1, wherein the thermoplastic composition has a degree of crystallinity in a range from about 3 percent to about 10 percent.

17. A film comprising a thermoplastic composition, the thermoplastic composition comprising:
   a thermoplastic polymer, wherein the thermoplastic polymer comprises polyetherimide in admixture with a polyaryletherketone polymer; and
   electrically conductive particles dispersed in the thermoplastic polymer, wherein the electrically conductive particles include metal coated graphite.

18. The film of claim 17, wherein the film has a thickness of about 1 mil to about 15 mil.

19. The film of claim 17, wherein the thermoplastic composition has a degree of crystallinity in a range from about 2 percent to about 15 percent.

20. The film of claim 17, wherein the electrically conductive particles comprise nickel-coated graphite.

* * * * *